United States Patent
Raffy

(10) Patent No.: US 7,139,022 B1
(45) Date of Patent: Nov. 21, 2006

(54) EDGE ENHANCER FOR RGB-BEYER TO YUV 4:2:0 CONVERTER WITH SHARPENED-Y FEEDBACK TO U, V TRANSFORMER

(75) Inventor: Philippe Raffy, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 954 days.

(21) Appl. No.: 10/065,899

(22) Filed: Nov. 27, 2002

Related U.S. Application Data

(63) Continuation-in-part of application No. 10/064,177, filed on Jun. 19, 2002, now Pat. No. 7,002,627.

(51) Int. Cl.
*H04N 9/04* (2006.01)
*G09C 5/02* (2006.01)

(52) U.S. Cl. ...................... 348/273; 345/604
(58) Field of Classification Search ............... 348/280, 348/222.1, 234, 252, 253, 273, 281, 266, 348/625; 345/604; 358/520
See application file for complete search history.

(56) References Cited

U.S. PATENT DOCUMENTS

| | | | | |
|---|---|---|---|---|
| 5,363,209 A | 11/1994 | Eschbach et al. | ........... | 358/445 |
| 5,367,629 A | 11/1994 | Chu et al. | ........... | 395/162 |
| 5,467,412 A | 11/1995 | Capitant et al. | ........... | 382/167 |
| 5,680,179 A | 10/1997 | D'Alto et al. | ........... | 348/607 |
| 5,696,850 A | 12/1997 | Parulski et al. | ........... | 382/261 |
| 5,799,111 A | 8/1998 | Guissin | ........... | 382/254 |
| 5,835,238 A | 11/1998 | Mantell | ........... | 358/458 |
| 5,889,562 A | 3/1999 | Pau | ........... | 348/447 |
| 6,075,889 A * | 6/2000 | Hamilton et al. | ........... | 382/167 |
| 6,192,162 B1 | 2/2001 | Hamilton, Jr. et al. | ........... | 382/266 |
| 6,229,578 B1 | 5/2001 | Acharya et al. | ........... | 348/607 |
| 6,266,817 B1 | 7/2001 | Chaddha | ........... | 725/146 |
| 6,342,918 B1 | 1/2002 | Inou et al. | ........... | 348/208 |
| 6,542,187 B1 * | 4/2003 | Hamilton et al. | ........... | 348/234 |
| 6,642,962 B1 * | 11/2003 | Lin et al. | ........... | 348/252 |
| 6,697,107 B1 * | 2/2004 | Hamilton et al. | ........... | 348/234 |
| 7,002,627 B1 * | 2/2006 | Raffy et al. | ........... | 348/273 |
| 2003/0007082 A1 * | 1/2003 | Watanabe | ........... | 348/273 |

FOREIGN PATENT DOCUMENTS

JP  2000023083 A  *  1/2000

* cited by examiner

*Primary Examiner*—Vivek Srivastava
*Assistant Examiner*—Timothy J. Henn
(74) *Attorney, Agent, or Firm*—Stuart T. Auvinen; g Patent LLC

(57) ABSTRACT

Red, Green, Blue (RGB) pixels in a Beyer pattern are converted to YUV pixels by a converter. The converter does not interpolate RGB pixels to fill in missing RGB color values but instead performs interpolation during conversion to YUV. An edge-enhancement filter is applied to the preliminary Y values to generate final Y values with sharpened edges. The final Y values are combined with R or B pixels from the Beyer pattern to generate U and V chrominance values. Since the preliminary luminance Y values are edge-enhanced, and then the edge-enhanced Y values are used to generate the U, V, values, enhancement improves U and V values as well. Rather than use full-frame intermediate buffers, a 7-line RGB buffer, a 5-line preliminary Y value buffer, and a 3-line final Y buffer can be used.

20 Claims, 15 Drawing Sheets

FIG. 2

PRIOR ART

INITIAL LUMINANCE COMPUTATION (YI)

C = 0.299, D = 0.587, E = 0.144

| G R G | R G R | B G B | G B G |
| B G B | G B G | G R G | R G R |
| G R G | R G R | B G B | G B G |
| PATTERN 1 | PATTERN 2 | PATTERN 3 | PATTERN 4 |

| D/8 C/2 D/8 | C/4 D/4 C/4 | E/4 D/4 E/4 | D/8 E/2 D/8 |
| E/2 D/2 E/2 | D/4 E D/4 | D/4 C D/4 | C/2 D/2 C/2 |
| D/8 C/2 D/8 | C/4 D/4 C/4 | E/4 D/4 E/4 | D/8 E/2 D/8 |
| COEFF FOR PATTERN 1 | COEFF FOR PATTERN 2 | COEFF FOR PATTERN 3 | COEFF FOR PATTERN 4 |

FIG. 8A   FIG. 8B   FIG. 8C   FIG. 8D

EDGE SHARPENING FOR LUMINANCE

| YI | YI | YI |
| YI | YI | YI |
| YI | YI | YI |

INITIAL Y PATTERN

FIG. 9A

| -1/16 | -2/16 | -1/16 |
| -2/16 | 12/16 | -2/16 |
| -1/16 | -2/16 | -1/16 |

COEFF FOR
EDGE SHARPENED Y

FIG. 9B

CHROMINANCE COMPUTATION

G B G
R G R
G B G

PATTERN 4

COEFF FOR
INTERMEDIATE
SUM (Y/9)

COEFF FOR
INTERMEDIATE
SUM (S_U)

COEFF FOR
INTERMEDIATE
SUM (S_V)

$U = 0.493 \times (S\_U - Y/9)$ $V = 0.877 \times (S\_V - Y/9)$

CHROMINANCE COMPUTATION FOR B-G-B PATTERN

```
B G B        1/9  1/9  1/9
G R G        1/9  1/9  1/9
B G B        1/9  1/9  1/9
```

PATTERN 3

FIG. 12A

COEFF FOR INTERMEDIATE SUM (Y/9)

COEFF FOR INTERMEDIATE SUM (S_U)

COEFF FOR INTERMEDIATE SUM (S_V)

$U = 0.493 \times (S\_U - Y/9)$ $V = 0.877 \times (S\_V - Y/9)$

EDGE ENHANCER FOR RGB-BEYER TO YUV 4:2:0 CONVERTER WITH SHARPENED-Y FEEDBACK TO U, V TRANSFORMER

CROSS REFERENCE TO RELATED APPLICATIONS

This application is a continuation-in-part of the application for Single-Step Conversion from RGB Bayer Pattern to YUV 4:2:0 Format, U.S. Ser. No. 10/064,177, filed Jun. 19, 2002 now U.S. Pat. No. 7,002,627.

BACKGROUND OF INVENTION

This invention relates to digital imaging, and more particularly to edge sharpening during conversion from RGB to YUV formats.

Rapid decrease in the cost of semiconductor devices has significantly increased the amount and complexity of calculations that relatively cheap processors can perform. Compute-intensive applications such as digital imaging can be migrated from the super-computer to the hand-held consumer device. Indeed, some type of digital imaging is widely deployed in stand-alone digital cameras and camcorders.

Devices such as cell phones and personal digital assistants (PDA's) sometimes include digital imaging components, especially as digital imaging is improved and cost-reduced. Digital-camera images are downloaded and stored on personal computers or wirelessly transmitted after capture from an integrated device. Video as well as still images can be captured, depending on the kind of digital camera.

FIG. 1 is a block diagram of a typical digital camera. Light is focused through a lens and directed toward sensor 12, which can be a charge-coupled device (CCD) array or a complementary metal-oxide-semiconductor (CMOS) sensor array. The light falling on the array generates electrical currents, which are amplified by analog amp 14 before being converted from analog to digital values by A/D converter 16. An 8-, 9-, or 10-bit mono-color pixel is output to interpolator 10. These mono-color pixels are in a Bayer-pattern as shown in FIG. 2. Each pixel is either a red, a blue, or a green intensity value. Each pixel has only one of the 3 color components rather than all 3 components per pixel.

The R, G, or B digital values in the Bayer (or Beyer) pattern are processed by interpolator 10 to interpolate missing pixels in the Bayer pattern. The filled-in pixels each have all 3 color components—R, G, and B. The filled-in RGB pixels can then be displayed on display 19.

Processor 15 converts the filled-in pattern of RGB pixels from interpolator 10 to luminance-chrominance YUV pixels. YUV pixels often have a 4:4:4 format, with 8 bits for each of 2 colors and for the luminance. However, other YUV formats such as 4:2:0 may be required by compressor 18, so second converter 11 may be required to convert 4:4:4 YUV pixels to 4:2:2 format, while third converter 11' converts 4:2:2 YUV pixels to 4:2:0 format. The converted YUV pixels can then be compressed by compressor 18 and stored on disk 17 or on a solid-state memory.

Sensor 12 detects red, blue and green colors. However, each point in the array of sensor 12 can detect only one of the three primary colors. Rather than outputting an RGB pixel, sensor 12 can output only a single-color pixel at any given time. For example, a line of pixels output by sensor 12 might have a red pixel followed by a green pixel. Another line might have alternating green and blue pixels.

Each pixel represents the intensity of one of the primary colors at a point in the sensor array. Thus a red pixel indicates the intensity of red light at a point, while a neighboring green pixel indicates the intensity of green light at the next point in the sensor array. Each pixel thus contains only one-third of the total color information.

The remaining color information is obtained by interpolation. The green intensity of a red pixel is calculated by averaging the green intensities of neighboring green pixels. The blue intensity for that red pixel is calculated by averaging or interpolating the nearest blue pixels. Interpolator 10 performs this color interpolation, calculating the missing primary-color intensities for each pixel location.

The electrical currents produced by the different primary colors can vary, depending on the sensor used and the wavelength and energy of the light photons. An adjustment known as a white-balance is often performed before interpolator 10, either on analog or digital values. Each primary color can be multiplied by a different gain to better balance the colors. Compensation can also be made for different lighting conditions, increasing all primary colors for dark pictures or decreasing all colors for bright pictures (over-exposure).

Bayer Pattern FIG. 2

FIG. 2 shows an image captured by a sensor that generates single-color pixels in a Bayer pattern. The example shows an 800×600 frame or image for display in the common super-VGA resolution. A total of 600 lines are captured by the sensor, with 800 pixels per line.

Personal computers and many other devices display full-color pixels that have all three primary-color intensities (RGB). In contrast, the sensor in a digital camera can detect only one of the three primary colors for each point in the 800×600 sensor array. Detectors for green are alternated with red detectors in the first line, while green detectors are alternated with blue detectors in the second line.

The first horizontal line and each odd line have alternating red and green detectors, so pixels output from these odd lines are in a G-R-G-R-G-R-G sequence. The second horizontal line and each even line have alternating green and blue detectors, so pixels output from these even lines are in a B-G-B-G-B-G-B sequence.

Half of the pixels are green pixels, while one-quarter of the pixels are read and the last quarter are blue. The green pixels form a checkerboard pattern, with blue and red pixels surrounded by green pixels. Since the human eye is more sensitive to green, the Bayer pattern has more green pixels than red or blue.

The green intensity for a red pixel location can be interpolated by averaging the four green pixels that surround the red pixel. For example, the green intensity for red pixel at location (3,2) is the sum of green pixels (3,1), (3,3), (2,2), and (4,2), divided by four. Likewise, the green intensity for a blue pixel location can be interpolated by averaging the four surrounding green pixels. For blue pixel (2,3), the interpolated green intensity is the sum of green pixels (2,2), (2,4), (1,3), and (3,3), divided by four.

The red and blue values for a green pixel location can also be calculated from the 2 red and 2 blue pixels that surround each green pixel. For green pixel (2,2), the interpolated red value is the average of red pixels (1,2) and (3,2) above and below the green pixel, while the interpolated blue value is the average of blue pixels (2,1) and (2,3) to the right and left of the green pixel.

Color interpolation, analog-to-digital conversion, and resolution of the sensor may cause images to be somewhat fuzzy. In particular, edges of objects in the image may not appear to the eye to be as sharp as when the object is viewed directly by the eye.

Image processing can be used to enhance the sharpness of edges in the image. Object edges often have rapid changes in color or brightness as pixels change from being captured from the object to being captured from the background. This rapid color or brightness change is typical of an edge and can be enhanced by image processing. For example, when a gradient or change in color or brightness is detected by an image processor, the gradient can be increased to produce a larger, sharper gradient. The sharper gradient increases the perception of sharpness of object edges.

While digital-camera processors are useful, cost reduction is desirable since digital cameras are price-sensitive consumer devices. Digital cameras may be a component of an integrated device such as a cell phone or PDA. Such integrated devices may use image compression to allow pictures to be compactly transmitted over wireless networks. Compression may require one or more format conversions. Edge enhancement may be desirable prior to compression. These format conversions and edge enhancements add to complexity and cost of the device.

What is desired is a digital-image processor that does not require interpolation on RGB pixels in the Bayer pattern. It is desired to combine color interpolation of Bayer-pattern pixels with format conversion to YUV. It is desired to use a single step conversion that both interpolates and generates YUV formats from a Bayer-pattern input. It is further desired to perform edge enhancement in an integrated manner with the conversion processing.

BRIEF DESCRIPTION OF DRAWINGS

FIG. 2 shows an image captured by a sensor that generates single-color pixels in a Bayer pattern.

FIGS. 8A–D illustrate patterns matched for preliminary luminance calculation and coefficients for generating preliminary YI luminance pixels without intermediate RGB interpolation.

FIGS. 9A–B show the pattern of the preliminary luminance Y values and the coefficients that are multiplied by the YI values to generate the edge-enhanced Y values.

FIGS. 10A–E illustrate the pattern matched for chrominance calculation and coefficients for generating intermediate sums without RGB interpolation.

FIGS. 12A–E illustrate for an alternate Bayer pattern initializations the patterns matched for chrominance calculation and coefficients for generating intermediate sums without RGB interpolation.

DETAILED DESCRIPTION

The present invention relates to an improvement in digital image enhancement. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

While edge enhancement could be performed on RGB pixels of the Bayer pattern or after YUV conversion is completed, the inventor has realized that edge enhancement can be included during a single re-formatting operation that converts RGB pixels to YUV pixels. Using such an integrated edge-enhancement and direct conversion step can reduce complexity and cost, as the intermediate full-pattern of interpolated RGB pixels are not generated.

RGB pixels are used to generate luminance Y values, which are then enhanced before the enhanced Y values are combined with the RGB values to generate the chrominance U, V values. Thus edge-enhancement of the Y values also enhances U, V chrominance values are they are being generated. All three components—Y, U, and V—benefit from edge enhancement, although edge enhancement is only directly performed on Y values.

Figure 1:
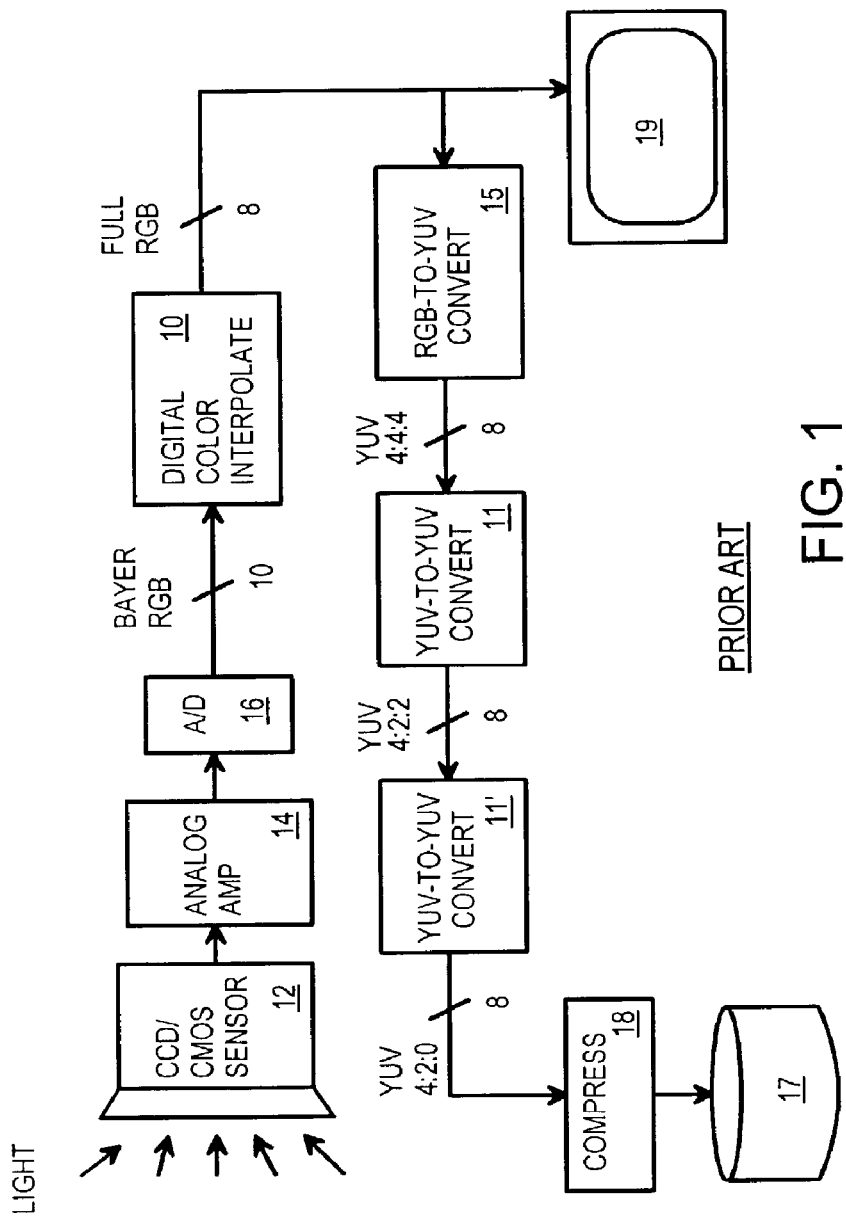
FIG. 1 is a block diagram of a typical digital camera.
Figure 3:
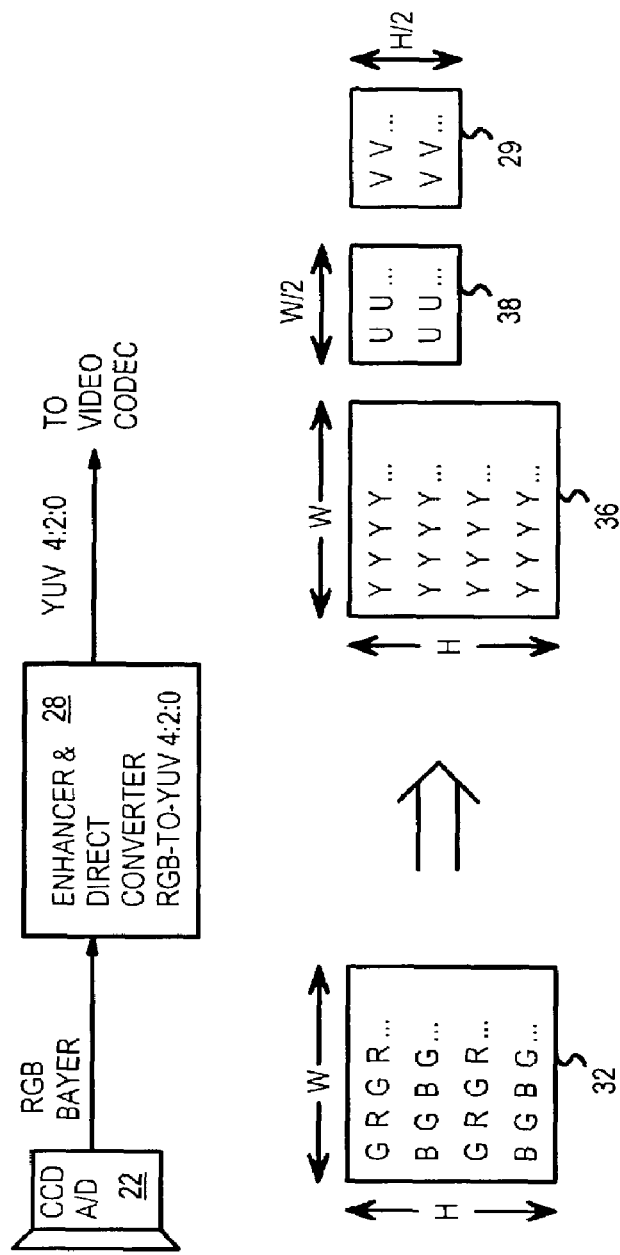
FIG. 3 highlights edge-enhancement during a direct conversion from RGB Bayer pattern to YUV.

FIG. 3 highlights edge-enhancement during a direct conversion from RGB Bayer pattern to YUV. Light captured by sensor front-end 22 is converted to electrical signals by a charge-coupled or transistor device, and the electrical signals are converted from analog to digital format.

Figure 2:
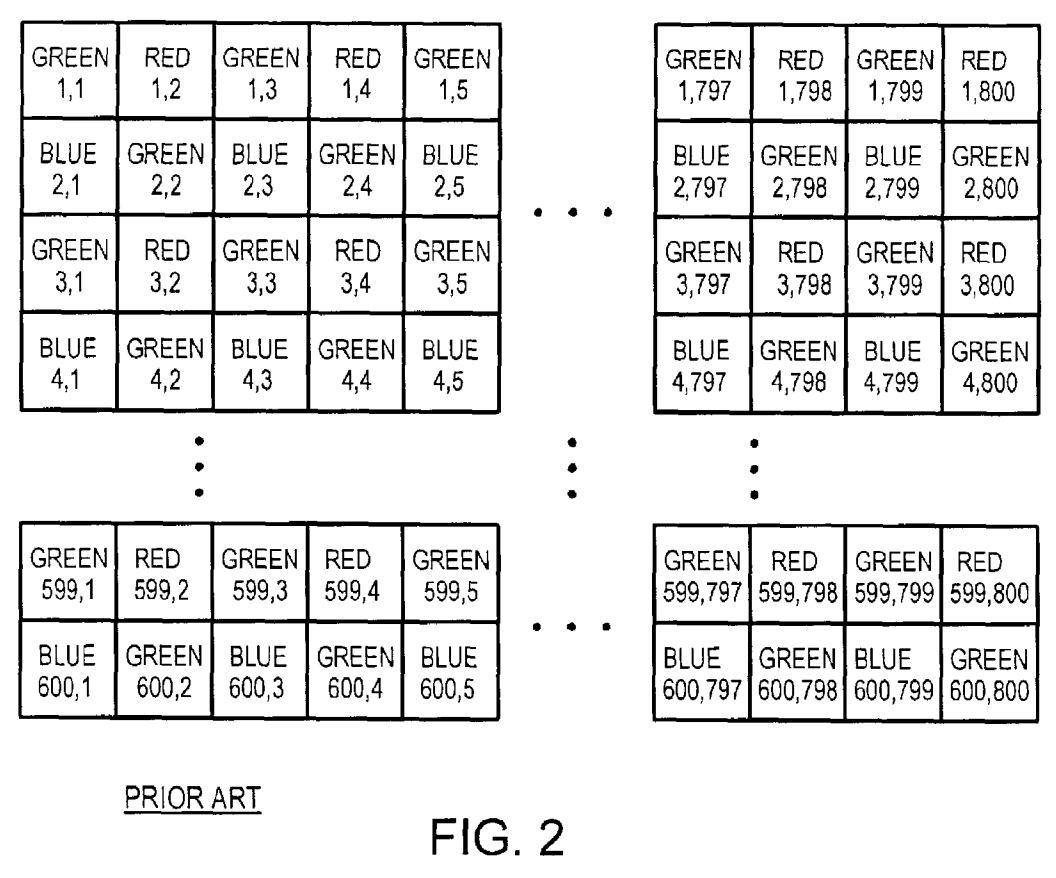

The image sensor does not generate all three primary color components (RGB) for each pixel. Instead only one of the three color-components is produced per pixel location. The colors produced alternate from pixel to pixel, and from line to line in a Bayer pattern as shown in FIG. 2. Typically one pixel with only one of the three primary colors is output for each clock cycle.

Direct converter 28 receives the Bayer-pattern input from front-end 22. The input Bayer pattern has missing color components. Direct converter 28 uses digital filters to both interpolate the missing color components and convert from RGB to YUV format. In particular, the pixels are directly converted to the YUV 4:2:0 format, and an intermediate YUV 4:4:4 format is not needed. Also, the luminance Y values are edge-enhanced during conversion after the preliminary Y values are generated but before the U, V chrominance values are created.

The output of direct converter 28 includes brightness or luminance array 36 of edge-enhanced Y pixels. One enhanced Y pixel is output for each pixel location in Bayer pattern 32 produced by front-end 22. Luminance array 36 thus has the same width W and height H as the original Bayer pattern 32.

Direct converter 28 also outputs chrominance U, V arrays 38, 29 that contain color information. The YUV 4:2:0 format generates one-quarter as many U pixels as Y pixels, so U array 38 has a width of W/2 and a height of H/2. Likewise, only one in four pixels of original Bayer pattern 32 has a V pixel generated by direct converter 28, so V array 29 has height H/2 and width W/2.

Edge-enhancement, interpolation and format conversion are all performed in one discrete step using direct converter 28. Intermediate arrays of pixel data, such as for filled-in RGB and YUV 4:4:4 pixels are not necessary, although circuitry could be added to generate these, such as when an RGB display is used. Only a few line buffers are needed, such as to store a few lines of preliminary Y values and edge-enhanced Y values.

Figure 4:
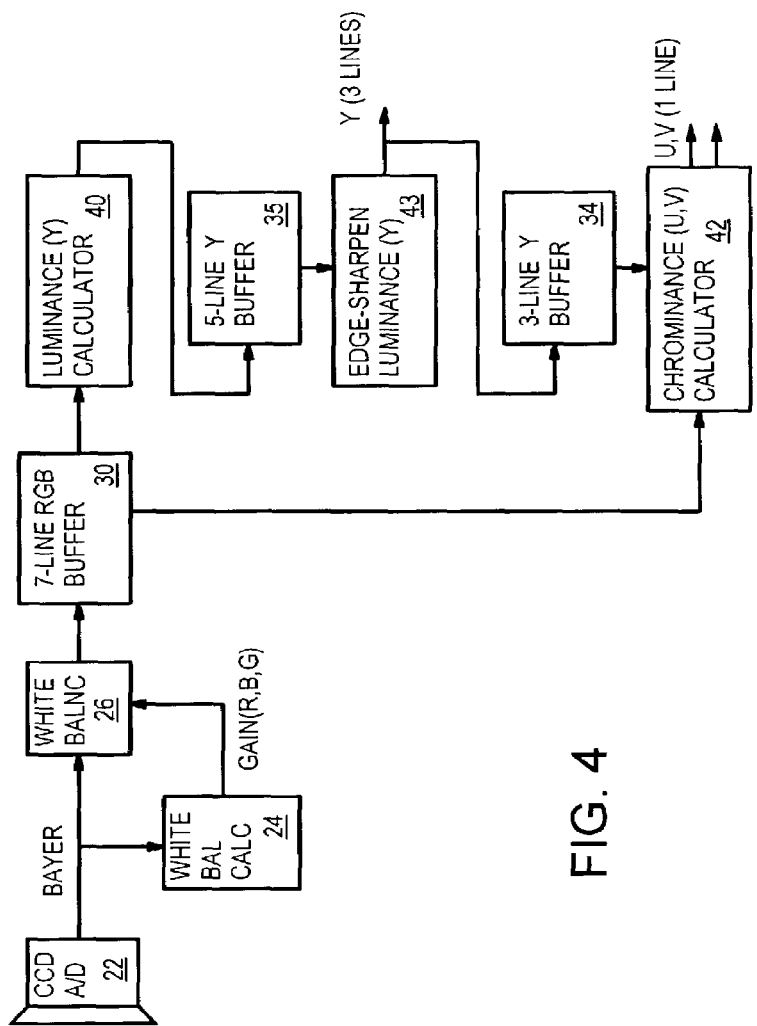
FIG. 4 shows a direct-conversion and edge-enhancement image processor using a 7-line Bayer-pattern buffer and 5-line and 3-line luminance buffers.

FIG. 4 shows a direct-conversion and edge-enhancement image processor using a 7-line Bayer-pattern buffer and 5-line and 3-line luminance buffers. Light captured by sensor front-end 22 is converted to electrical signals by a charge-coupled, transistor, or other sensing device, and the electrical signals are converted from analog to digital format. The image sensor does not generate all three primary color components (RGB) for each pixel, but only produces one of the three color-components per pixel. The colors produced alternate from pixel to pixel, and from line to line in a Bayer pattern as shown in FIG. 2. Typically one pixel with only one of the three primary colors is output for each clock cycle.

The sensitivity of the sensor to the different primary colors is not equal. Some colors experience more attenuation than others. Also, the image may be under or over exposed. White balancer 26 multiplies each pixel from front end 22 by a gain. Red pixels are multiplied by a red gain, blue pixels by a blue gain, and green pixels by a green gain. The pixel-gain product is output from white balancer 26 to line buffer 30.

The pixel gains may be pre-set gains, or may be calculated on the fly. Pre-set gains can be calculated at the factory for the sensor type and fixed gains stored in a register and applied to white balancer 26. Video digital cameras produce a series of frames, and still cameras are normally pointed toward the picture before shooting, so gain calculator 24 can generate a running average of all pixels for each of the 3 colors from one or more frames, and use the averages to calculate gains for the next frame. Averages can also be generated for just a portion of an image frame, and the gains applied to the entire image or a portion of the image.

Seven-line buffer 30 contains about seven lines of pixels, rather than all 600 or more lines. For SVGA resolution, each line contains 800 pixels, so line buffer 30 contains 800×7 or 5,600 pixels. Other resolutions, such as 1024×768 have more pixels per line, so the size of line buffer 30 can increase.

Luminance calculator 40 receives the R, G, and B Bayer-pattern pixels from buffer 30 and generates a luminance (Y) value for each pixel location. Rather than simply convert each single Bayer-pattern pixel to a Y pixel, an averaging filter is used that receives 9 pixels from 3 lines of the Bayer pattern in buffer 30. Using 9 pixels rather than just 1 allows for more colors and locations to be included when calculating the Y pixel at the center of the 9-pixel block or box.

Since each Y pixel is generated from 3 lines of Bayer-pattern pixels, the 7 lines of buffer 30 are reduced to 5 lines of Y pixels that are stored in five-line Y buffer 35. Edge-sharpener 43 also uses a 3-line (9-pixel) filter to generate an edge-enhanced Y pixel for the center of the 3×3 filter. Thus edge-sharpener 43 reduces the 5 lines of preliminary Y pixels from five-line Y buffer 35 to 3 lines of enhanced Y pixels for three-line Y buffer 34.

Luminance calculator 40 performs both horizontal and vertical interpolation over the 9-pixel-box input to generate the Y pixel in the center of the 3×3 box. All three color components (R,G,B) are included in the 3×3 input since the R, G, and B pixels alternate in the Bayer pattern. Only the center pixel and neighboring Bayer-pattern pixels that touch the center pixel's location at the center of the 3×3 box are input to luminance calculator 40. There are a total of 8 such neighboring pixels three pixels on three lines.

The weighting or filter coefficients for each pixel in the 3×3 box varies by color, since there are twice as many green pixels in a Bayer pattern as there are red or blue pixels. The green pixels form a checkerboard pattern with green pixels on every line, but the red or blue pixels form a more open pattern with pixels only on alternating lines. Thus different filter coefficients are applied to pixels depending on the current location within the Bayer pattern.

Similarly, edge-sharpener 43 receives 9 preliminary Y pixels in a 3×3 box, and generates the edge-enhanced Y pixel in the center of the 3×3 box. The weighting or filter coefficients for each pixel in the 3×3 box varies by location, to enhance or increase the magnitude of any change in brightness between the center pixel and any of the 8 surrounding pixels. Thus different filter coefficients are applied to pixels depending on the current location within the preliminary Y pattern.

Chrominance calculator 42 generates either a U or a V chrominance pixel value for each block of four pixel locations of the Bayer pattern. Blue (B) pixels within the 3×3 box from the Bayer pattern are input from buffer 30 to chrominance calculator 42 when the U component is calculated, while red (R) pixels within the 3×3 Bayer-pattern box are input to chrominance calculator 42 from buffer 30 when the V component is calculated.

In addition to the R or B Bayer-pattern pixels input from buffer 30, a 3×3 box of edge-enhanced luminance (Y) values are input from 3-line buffer 34 to chrominance calculator 42. An average of the 9 Y values is included when generating the chrominance value. Thus chrominance calculator 42 receives red (R) and blue (B) Bayer-pattern pixels, and enhanced Y luminance values, but does not receive green (G) pixels from the Bayer pattern.

A single line of U and V components are generated by chrominance calculator 42 from the 5 lines in buffer 30. The line of U and V components can be stored to U and V arrays for later packing into the YUV format.

Five lines of preliminary Y components are generated by luminance calculator 40 from the 7 lines in buffer 30. One Y line is generated at a time, but a total of 5 lines are stored in buffer 35. The preliminary Y values from luminance calculator 40 can be stored in an array or packed into a preliminary format.

Three lines of Y components are generated by edge-sharpener 43 from the 5 lines in buffer 35. One Y line is generated at a time, but a total of 3 lines are stored in buffer 34. The enhanced Y values from edge-sharpener 43 can likewise be stored in an array or packed into the desired YUV format and output as a bitstream.

Figure 5:
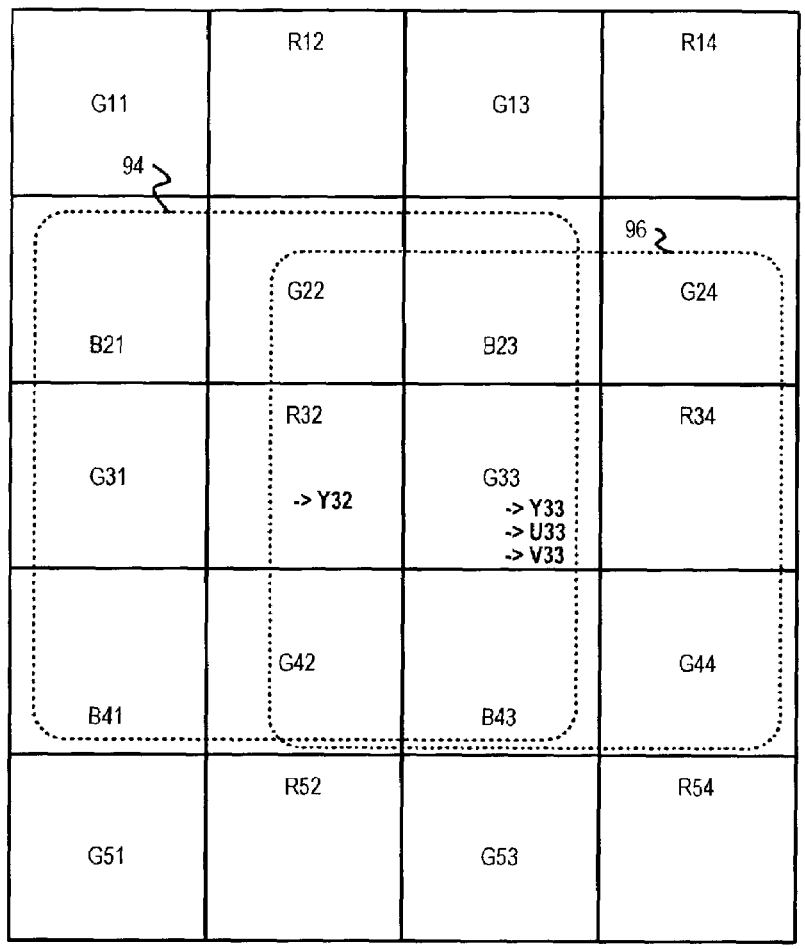
FIG. 5 illustrates locations of the final generated Y, U, and V components for the five center rows of Bayer-pattern pixels stored in the 7-line buffer.

FIG. 5 illustrates locations of the final generated Y, U, and V components for the five center rows of Bayer-pattern pixels stored in the 7-line buffer. The R, G, and B pixels of the Bayer-pattern input are stored in five-line buffer 30 for later input to the luminance and chrominance calculators. Each pixel in the diagram has a row and column number indicating its location. For example, the second pixel on the fourth row is G42, indicating a green pixel. There is no red or blue pixel for location 4,2 since the Bayer pattern is not filled in. Rows 0 and 6 of the 7-line buffer are not shown.

Nine Bayer-pattern pixels at a time are input to the luminance calculator. When luminance pixel Y32 is to be generated, filter 94 inputs nine pixels:

B21, G22, B23 from row 2,
G31, R32, G33 from row 3, and
B41, G42, B43 from row 4.

This 3×3 box has a red pixel in the center position, and matches pattern 3 of FIG. 8C. The filter coefficients of FIG. 8C are then multiplied by the corresponding Bayer-pattern pixels from input filter 94 and the nine products summed to generate the preliminary or initial YI pixel for the center of the 3×3 box, pixel YI32. Then edge enhancement is performed on the 9 preliminary YI pixels from the 3×3 box at the same location, producing the enhanced Y pixel for the center of the 3×3 box, pixel Y32.

The U and V chrominance pixels are not generated for location 3,2, due to down-sampling.

For the following pixel location (3,3), the input location is moved filter 96. Filter 96 input the nine pixels:

G22, B23, G24 from row 2,
R32, G33, R34 from row 3, and
G42, B43, G44 from row 4.

This 3×3 box has a green pixel in the center position, and red pixels to the right and left of the center pixel, and matches pattern 4 of FIG. 8D. The filter coefficients of FIG. 8D are then multiplied by the corresponding Bayer-pattern pixels from input filter 96 and the nine products summed to generate the preliminary or initial YI pixel for center of the 3×3 box, pixel YI33. Edge enhancement is performed on the 9 preliminary YI pixels from the 3×3 box at the same location, producing the enhanced Y pixel for the center of the 3×3 box, pixel Y33.

The U and V chrominance pixels are generated for location 3,3 by the chrominance calculator using input filter 96. Only the two blue pixels B23 and B43 are input to the chrominance calculator to generate U33. The other red and green pixels are ignored. Likewise, only the two red pixels R32 and R34 are input to the chrominance calculator to generate V33 while the other blue and green pixels are ignored. However, all nine edge-enhanced luminance Y pixels generated for locations in the 3×3 box of filter 96 are also input to chrominance calculator and used to calculate U33 and V33.

The U and V chrominance pixels are not generated for locations 3,2 and 3,4. Also, the U, V components are not generated for alternating lines, such as for lines 2 and 4. The YUV 4:2:0 format has half as many U and V pixels as Y pixels, so every other pixel location skips generation of U and V components and alternate lines generate no U or V components. Also, the bit-size of the U and V pixels is half that of the Y pixels. Thus there is a higher luminance precision than for each chrominance component, but the overall chrominance precision matches the luminance precision using this format.

Figure 6A:
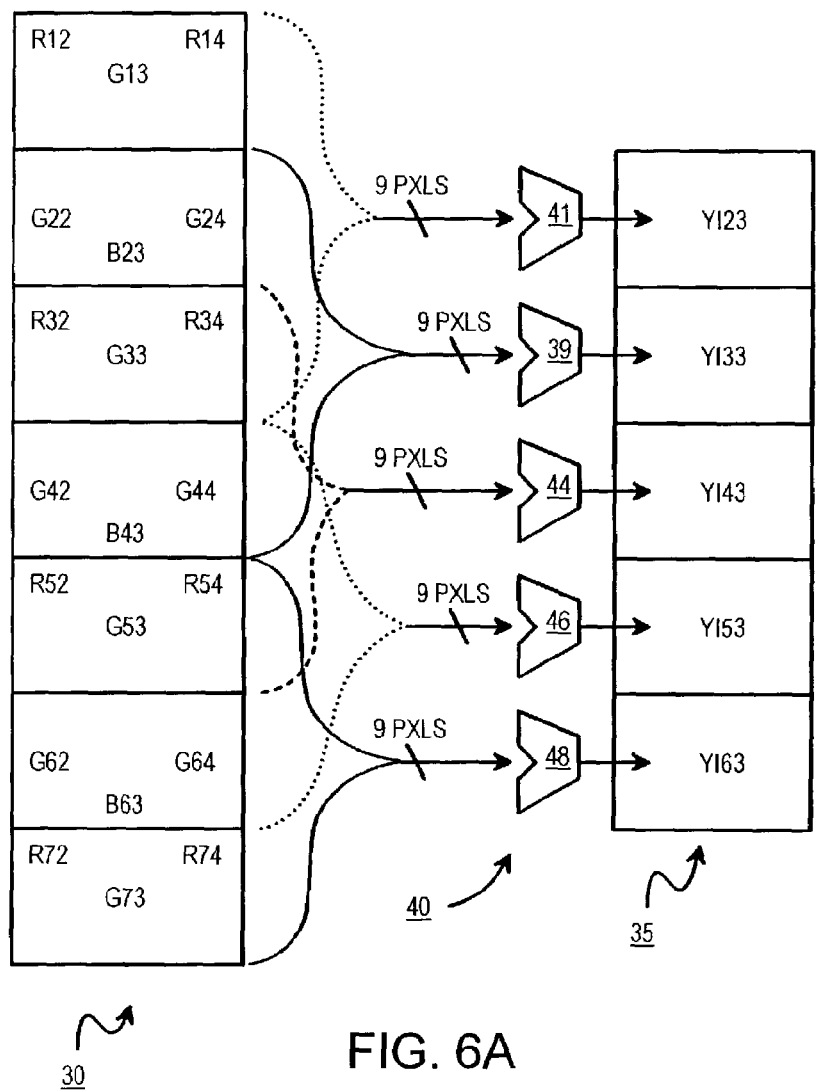
FIG. 6A highlights preliminary luminance calculation from a Bayer-pattern input without intermediate RGB interpolation.

FIG. 6A highlights preliminary luminance calculation from a Bayer-pattern input without intermediate RGB interpolation. Three columns of 7-line buffer 30 are shown. Bayer-pattern pixels G22, B23, G24, R32, G33, R34, G42, B43, G44 are input to calculator 39, which multiplies each of the 9 input pixels by a corresponding coefficient, and then sums the 9 products to generate the preliminary luminance at the center of the 3×3 box. Pixel YI33 is output to five-line buffer 35 for edge enhancement.

The upper and lower YI values YI23, YI43, YI53, YI63 may be calculated in parallel with YI33, or may be generated at different times. Upper calculator 41 receives 9 Bayer-pattern pixels R12, G13, R14, G22, B23, G24, R32, G33, R34. Upper calculator 41 multiplies each of the 9 input pixels by a corresponding coefficient, and sums the 9 products to generate the preliminary luminance at the center of the upper 3×3 box. Pixel YI23 is output to five-line buffer 35.

Similarly, lower calculator 44 receives 9 Bayer-pattern pixels R32, G33, R34, G42, B43, G44, R52, G53, R54. Lower calculator 48 multiplies each of its 9 input pixels by a corresponding coefficient, and sums the 9 products to generate the preliminary luminance at the center of the lower 3×3 box. Pixel YI43 is output to five-line buffer 35.

Other lower calculators 46, 48 operate in a similar manner. Lower calculator 46 generates preliminary Y value YI53 from inputs G42, B43, G44, R52, G53, R54, G62, B63, G64. Lower calculator 48 generates preliminary Y value YI63 from inputs R52, G53, R54, G62, B63, G64, R72, G73, R74.

Edge-sharpener 43 can include calculators 41, 39, 44, 46, 48 operating in parallel, or one or more calculators could be used for each calculation in sequence, but with the input filter and output locations shifted.

Figure 6B:
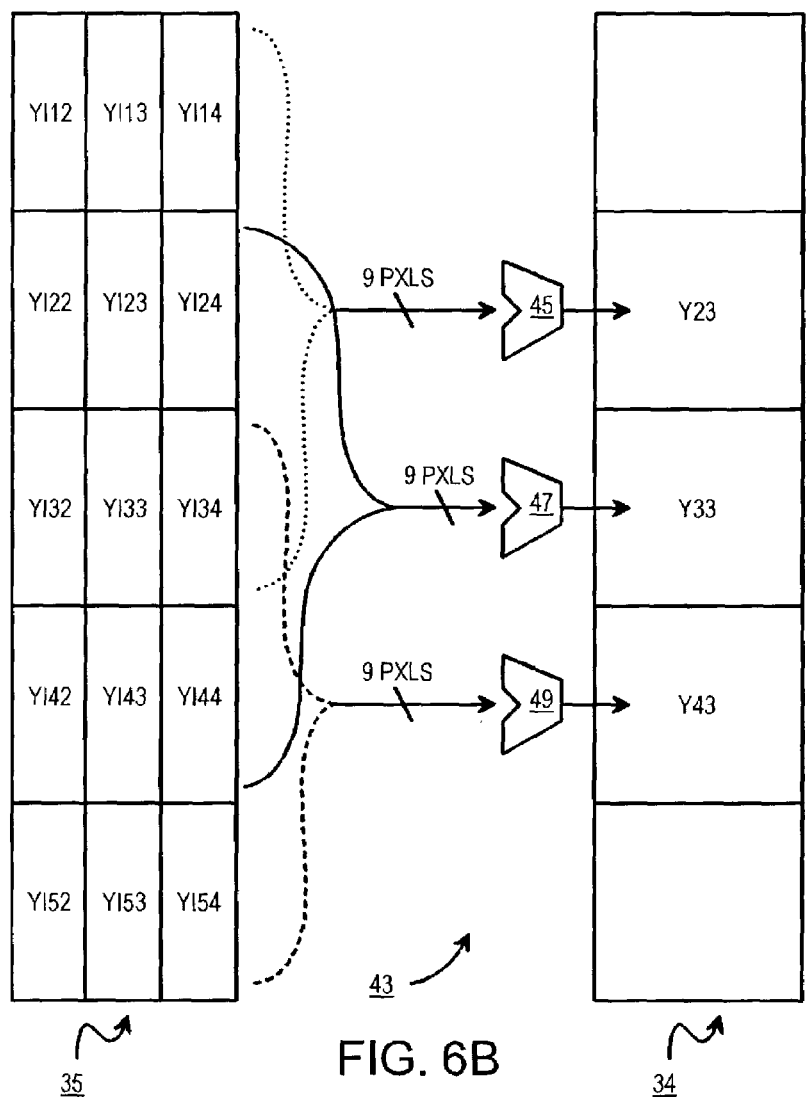
FIG. 6B highlights edge enhancement of preliminary Y values.

FIG. 6B highlights edge enhancement of preliminary Y values. Three columns of 5-line buffer 35 are shown. Preliminary Y pixels YI22, YI23, YI24, YI32, YI33, YI34, YI42, YI43, YI44 are input to calculator 47, which multiplies each of the 9 preliminary Y pixels by a corresponding coefficient, and then sums the 9 products to generate the edge-enhanced luminance Y33 at the center of the 3×3 box. Pixel Y33 is output to three-line buffer 34 and is also stored in the output Y array.

The upper and lower edge-enhanced Y values Y23, Y43 may be calculated in parallel with Y33, or may be generated at different times. Upper calculator 45 receives 9 preliminary Y pixels YI12, YI13, YI14, YI22, YI23, YI24, YI32, YI33, YI34. Upper calculator 45 multiplies each of the 9 input pixels by a corresponding coefficient, and sums the 9 products to generate the luminance at the center of the upper 3×3 box. Pixel Y23 is output to three-line buffer 34 and is also stored in the output Y array.

Similarly, lower calculator 49 receives 9 Bayer-pattern pixels YI32, YI33, YI34, YI42, YI43, YI44, YI52, YI53, YI54. Lower calculator 49 multiplies each of its 9 input pixels by a corresponding coefficient, and sums the 9 products to generate the enhanced luminance at the center of the lower 3×3 box. Pixel Y43 is output to three-line buffer 34 and is also stored in the output Y array.

Luminance calculator 40 can include calculators 45, 47, 49 operating in parallel, or one calculator could be used for each calculation in sequence, but with the input filter and output locations shifted.

Figure 7A:
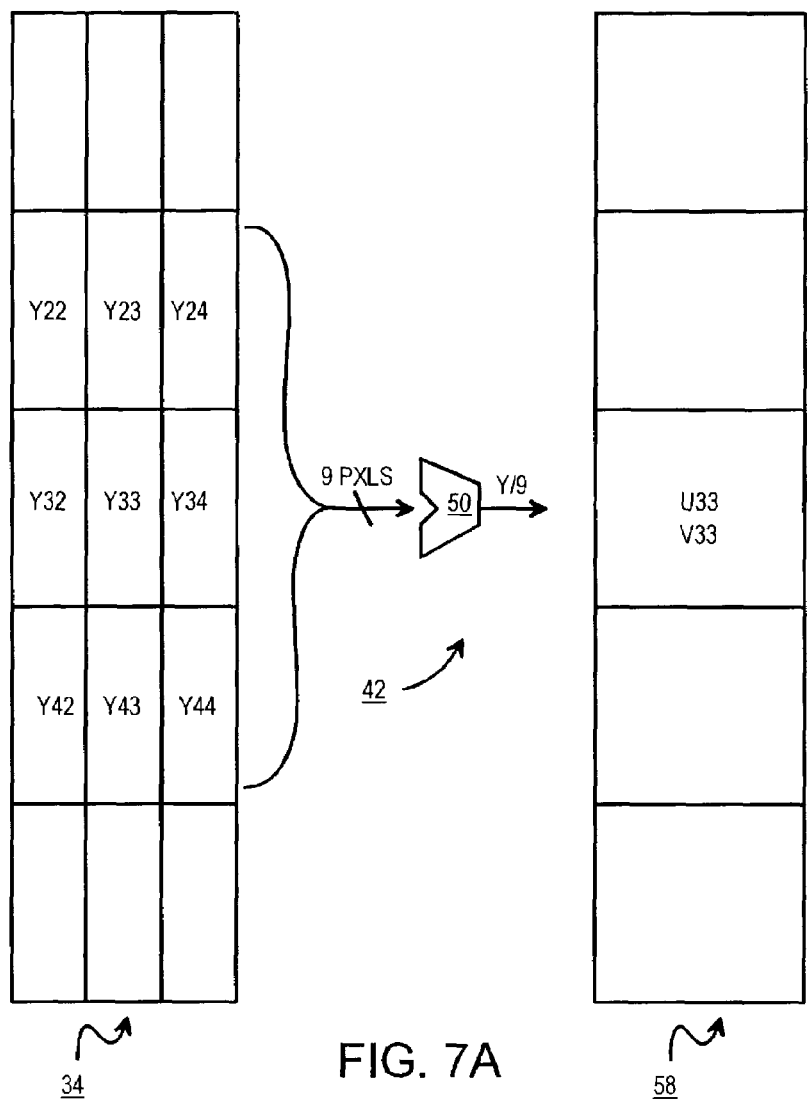
FIGS. 7A–C illustrate chrominance calculation from Bayer-pattern input pixels and edge-enhanced luminance pixels without intermediate RGB interpolation.
Figure 7B:
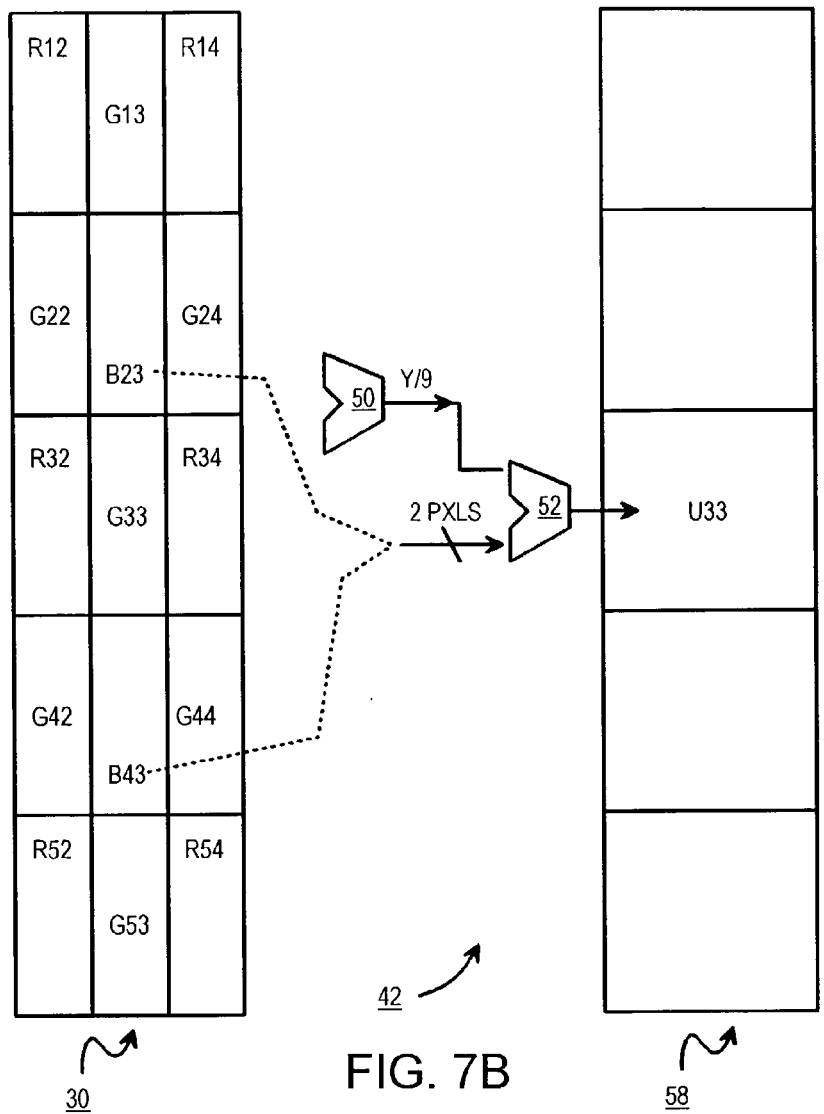
Figure 7C:
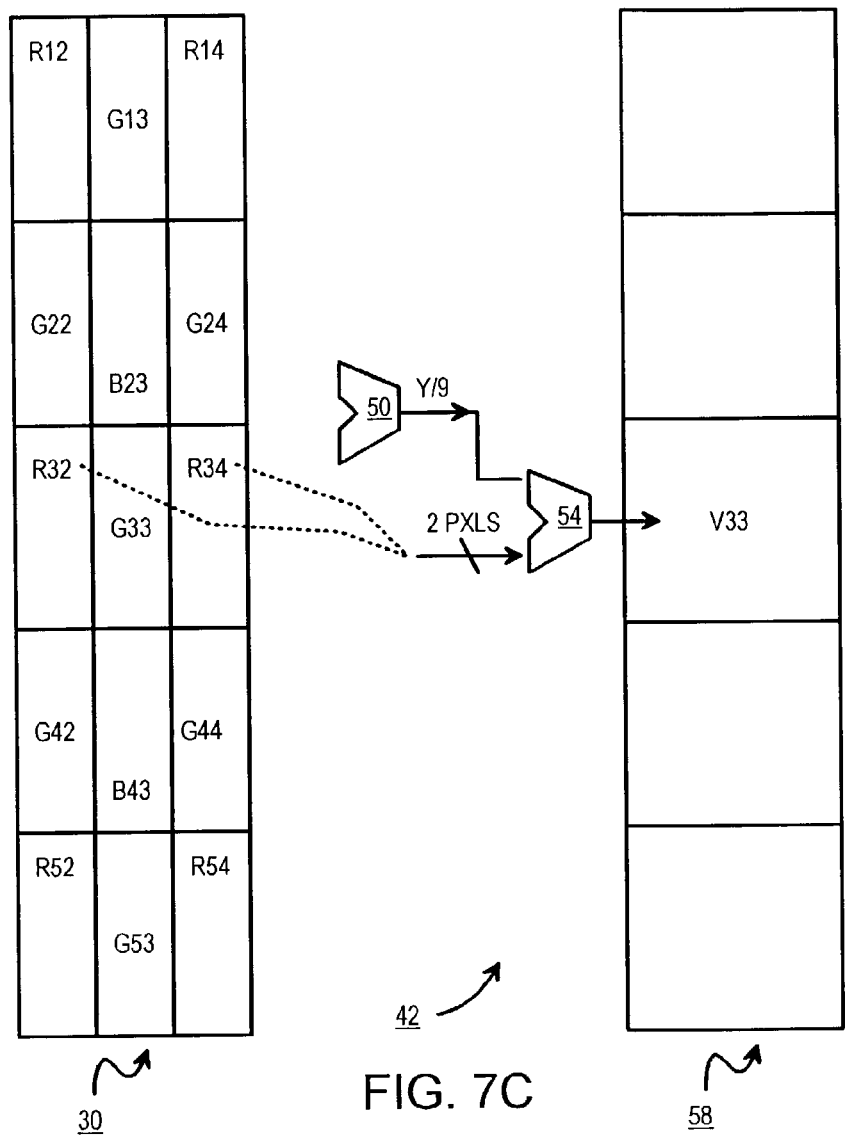

FIGS. 7A–C illustrate chrominance calculation from Bayer-pattern input pixels and edge-enhanced luminance pixels without intermediate RGB interpolation. A 3×3 box of edge-enhanced luminance (Y) pixels are read from 3-line buffer 34. In this example, center location 3,3 is being calculated, so edge-enhanced luminance pixels Y22, Y23, Y24, Y32, Y33, Y34, Y42, Y43, Y44 are input to calculator 50 in chrominance calculator 42. Calculator 50 generates an average enhanced luminance of the 9 input pixels by multiplying each of the nine Y pixels by a coefficient equal to 1/9, and then summing the 9 products.

The result from calculator 50, labeled "Y/9" is temporarily stored and used to calculate both the U and V components for the center pixel, U33, V33. The intermediate Y/9 luminance average can be stored in a temporary or pipeline buffer (not shown) other than chrominance output array 58.

FIG. 7B highlights calculation of the U chrominance component from the luminance average and blue pixels of the un-interpolated Bayer-pattern. The Y/9 luminance average from calculator 50 is input to calculator 52 of chrominance calculator 42. Only the blue pixels within the 3×3 input box are input to calculator 52. The green and red pixels in the 3×3 box are ignored. Since only 2 of the 9 pixels in the 3×3 box are blue pixels, only two Bayer-pattern pixels are input to calculator 52. The two blue pixels input are B23 and B43.

Calculator 52 multiplies the two blue pixels by corresponding coefficients shown in FIG. 10C, and sums the two products to get an average blue pixel (S_U). The Y/9 luminance average is then subtracted from the average blue pixel, and the difference is multiplied by a constant to generate the U component at the center of the 3×3 box, U33. The generated U component can then be stored in chrominance output array 58 or further operated upon for compression or packing.

FIG. 7C highlights calculation of the V chrominance component from the luminance average and red pixels of the un-interpolated Bayer-pattern. The Y/9 luminance average from calculator 50 is input to calculator 54 of chrominance calculator 42. Only the red pixels within the 3×3 input box are input to calculator 54. The green and blue pixels in the 3×3 box are ignored. Since only 2 of the 9 pixels in the 3×3 box are red pixels, only two Bayer-pattern pixels are input to calculator 54. The two red pixels input are R32 and R34.

Calculator 54 multiplies the two red pixels by corresponding coefficients shown in FIG. 10D, and sums the two products to get an average red pixel (S_V). The Y/9 luminance average is then subtracted from the average red pixel, and the difference is multiplied by a constant to generate the V component at the center of the 3×3 box, V33. The generated V component can then be stored in chrominance output array 58 or further operated upon for compression or packing.

FIGS. 8A–D illustrate patterns matched for preliminary luminance calculation and coefficients for generating preliminary YI luminance pixels without intermediate RGB interpolation. For the Bayer pattern, any 3×3 box of pixels matches one of four possible patterns. These patterns and coefficients are for generating the preliminary luminance YI pixels before edge enhancement.

Since the Bayer pattern has twice as many green pixels are either red or blue pixels, two of the four patterns have green pixels in the center. Pattern 1 (FIG. 8A) has a green center pixel and red at the top and bottom, while pattern 4 (FIG. 8D) has blue above and below the green center pixel. The blue pixel is at the center for pattern 2, (FIG. 8B), while the red pixel is at the center for pattern 3 (FIG. 8C).

Each pixel in a 3×3 pattern is multiplied by a coefficient. The 3×3 matrix of coefficients for each pattern is shown below the pattern. For example in FIG. 8A, the two red pixels are each multiplied by a coefficient of C/2, while the two blue pixels are multiplied by a coefficient of E/2. The center green pixel is multiplied by D/2, while the other four green pixels are multiplied by D/8. The preliminary luminance is then generated by summing the 9 products.

The constants C, D, E are chosen to account for variations in perceived intensity of the primary red, green, and blue colors and for the color composition of the Bayer pattern itself. For example, green is multiplied by constant D, which is larger than constant E which is multiplied by blue pixels and constant C which is multiplied by red pixels. These constants could be adjusted to account for chromatic errors of the light sensor, lens, display, or other components. The constant C is 0.299, D is 0.587, and E is 0.144 in this embodiment.

FIGS. 9A–B show the pattern of the preliminary luminance Y values and the coefficients that are multiplied by the YI values to generate the edge-enhanced Y values. In FIG. 9A, a 3×3 box of preliminary YI values are input from the 5-line buffer after generation by the luminance generator. The edge-enhanced Y value for the center pixel location is generated from the 9 input YI values.

FIG. 9B shows the coefficients that are multiplied by each preliminary luminance YI value. Edge-sharpener 43 multiplies each of the 9 preliminary YI values by a coefficient shown in FIG. 9B, then sums the 9 products to get an enhancement. The enhancement is then added to the center pixels YI value to get the edge-enhanced Y value.

The center YI value is multiplied by a positive coefficient while the 8 outer YI values are each multiplied by negative coefficients. Also, the magnitude of the center coefficient is much larger than the outer coefficients. This difference between the center and outer coefficients helps to increase differences between the center pixel and the outer pixels, thus enhancing any gradient in the preliminary luminance YI between the center and adjacent pixels.

The center pixel has a coefficient of 12/16, or 0.75, which is positive. The four coefficients to the sides and above and below the center have coefficients of −2/16, while the four corner coefficients are half as large as the side coefficients, or −1/16. The magnitude of the total contribution from the 8 surrounding pixel locations is the same as from the center location, when the pixels all have the same YI values. Thus when no gradient exists, all pixels have the same YI values and the sum of all the products is zero. Thus the enhancement is zero and the center Y value is the same as the preliminary YI value. Energy is preserved by using such zero-sum coefficients, although non-zero-sum coefficients that do not preserve energy could be substituted.

When a gradient exists, the enhancement is positive or negative, depending on the values of the center pixel and surrounding pixels. For example, when the center pixel is much larger than the sum of the surrounding pixels, a positive enhancement results, increasing the value of the center pixel. Eight-bit pixels can have numeric values from 0 to 255, with each numeric value representing a color. Sixteen-bit pixels can have a larger range, and other pixel bit sizes are possible.

FIGS. 10A–D illustrate the pattern matched for chrominance calculation and coefficients for generating intermediate sums without RGB interpolation. Chrominance components are generated after edge enhancement of the luminance Y values. The enhanced luminance Y values rather than the preliminary YI luminance values are used for chrominance generation.

Chrominance components are only generated for one of the four possible patterns of 3×3 Bayer-pattern pixels, pattern 4. Pattern 4 is shown in FIG. 10A, and has a green pixel at the center and at the four corners. Blue pixels are at the top and bottom center, with red pixels to the right and left of the center green pixel.

To generate the average luminance (Y/9) for the 3×3 box, each of the 9 edge-enhanced luminance pixels generated by the edge-sharpener and stored in the 3-line buffer are multiplied by 1/9. Thus the coefficients for generating the Y/9 average are all 1/9, as shown in FIG. 10B. These coefficients are multiplied by the enhanced Y values rather than the Bayer-pattern pixels or the preliminary Y values.

To generate the U component, and intermediate U average, S_U, is generated by the chrominance calculator. The two blue pixels of pattern 4 (above and below the center pixel) are each multiplied by 1/2, while the other green and red pixels are ignored, or multiplied by 0. The coefficients for generating the intermediate U average S_U are shown in FIG. 10C. These coefficients are multiplied by the Bayer-pattern pixels from the 7-line buffer.

To generate the V component, and intermediate V average, S_V, is generated by the chrominance calculator. The two red pixels of pattern 4 (to the right and left of center pixel) are each multiplied by 1/2, while the other green and blue pixels are ignored, or multiplied by 0. The coefficients for generating the intermediate V average S_V are shown in FIG. 10D. These coefficients are also multiplied by the Bayer-pattern pixels from the 7-line buffer.

To compute the final U and V pixels, the Y/9 luminance average is subtracted from the intermediate U and V averages, and then the differences are multiplied by different constants. As shown in FIG. 10E, the S_U–Y/9 difference is multiplied by the constant 0.493 to generate the U pixel at the center of the 3×3 box. To generate the V pixel, the S_V minus Y/9 difference is multiplied by the constant 0.877. The V constant is larger than the U constant because the human eye is more sensitive to blue than to red, so red is intensified relative to blue.

Figure 11A:
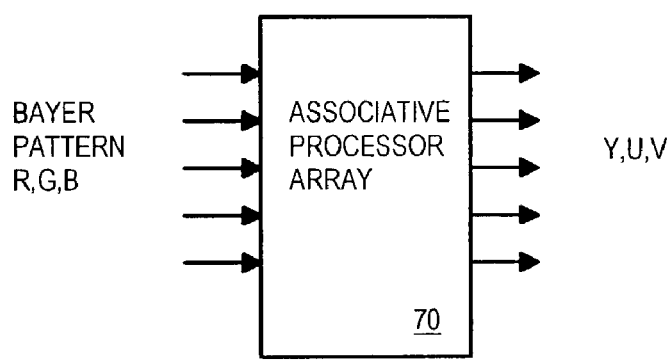
FIG. 11A shows using an associative array processor to directly generate YUV pixels from an RGB Bayer-pattern without intermediate interpolation.

Various parallel processing techniques may be used that perform the basic operations described here in a serial fashion for easier understanding. FIG. 11A shows using an associative array processor to directly generate YUV pixels from an RGB Bayer-pattern without intermediate interpolation. The associative processor array can use a content-addressable memory array and other logic to perform logic and mathematic operations on many data values at once. Patterns of data values (pixels) can be searched for and matched and replaced with a result pattern. For example, all G pixel values equal to 0.5002 could be searched for and replaced with a Y pixel value of 0.2387 or some other value.

Figure 11B:
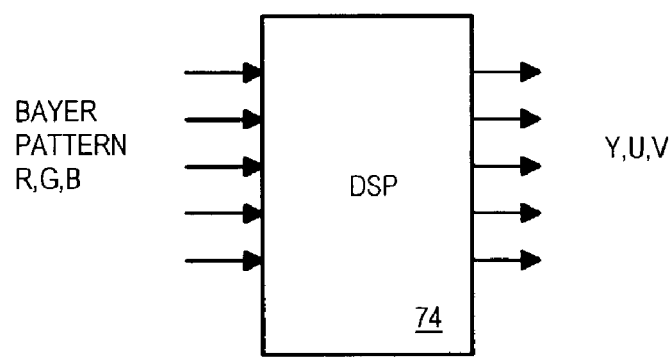
FIG. 11B shows using a digital-signal processor (DSP) to perform luminance and chrominance calculations.

FIG. 11B shows using a digital-signal processor (DSP) to perform luminance and chrominance calculations. DSP 74 can be programmed to read R, G, and B pixels in 3×3 boxes from an input Bayer pattern, and perform calculation steps to generate edge-enhanced luminance and chrominance values. These calculations can be performed in series or in parallel when multiple calculation engines are included in DSP 74.

FIGS. 12A–D illustrate for an alternate Bayer pattern initializations the patterns matched for chrominance calculation and coefficients for generating intermediate sums without RGB interpolation. Some image sensors may initialize the Bayer pattern at a different location than shown in FIG. 2. For example, the pattern may begin with a red pixel rather than a green pixel, and the entire pattern may then be shifted over by one column. Then if U, V generation is still performed at locations (1,1), (1,3), (3,1), (3,3), etc, the 3×3 box matches pattern 3 (FIG. 8C) rather than pattern 4.

Chrominance components are only generated for one of the four possible patterns of 3×3 Bayer-pattern pixels, pattern 3. Pattern 3 is shown in FIG. 12A, and has a red pixel at the center. Green pixels are above, below, to the right and left of the center red pixel. Blue pixels are at the four corners.

To generate the average luminance (Y/9) for the 3×3 box, each of the 9 edge-enhanced luminance pixels generated by the edge-sharpener and stored in the 3-line buffer are multiplied by 1/9 as described before. The coefficients for generating the Y/9 average are all 1/9, as shown in FIG. 12B. These coefficients are multiplied by the Y values rather than the Bayer-pattern pixels or the preliminary YI values.

To generate the U component, and intermediate U average, S_U, is generated by the chrominance calculator. The four blue pixels of pattern 3 (above and below and to the left and right of the center pixel) are each multiplied by 1/4, while the other green and red pixels are ignored, or multiplied by 0. The coefficients for generating the intermediate U average S_U are shown in FIG. 12C. These coefficients are multiplied by the Bayer-pattern pixels from the 7-line buffer.

To generate the V component, and intermediate V average, S_V, is generated by the chrominance calculator. The one red pixels of pattern 3 (the center pixel) is multiplied by 1, while the other green and blue pixels are ignored, or multiplied by 0. The coefficients for generating the intermediate V average S_V are shown in FIG. 12D. These coefficients are also multiplied by the Bayer-pattern pixels from the 7-line buffer.

To compute the final U and V pixels, the Y/9 luminance average is subtracted from the intermediate U and V averages, and then the differences are multiplied by different constants. As shown in FIG. 12E, the S_U–Y/9 difference is multiplied by the constant 0.493 to generate the U pixel at the center of the 3×3 box. To generate the V pixel, the S_V minus Y/9 difference is multiplied by the constant 0.877. The V constant is larger than the U constant because the human eye is more sensitive to blue than to red, so red is intensified relative to blue.

Similar alterations can be made for other initializations of the Bayer pattern, such as when patterns 1 or 2 occur around pixel location 3,3. When chrominance-generating locations occur at other locations, then these locations can be matched to one of the four patterns. For example, chrominance may be generated at locations (2,2), (2,4), (4,2), (4,4), etc.

ALTERNATE EMBODIMENTS

Several other embodiments are contemplated by the inventor. For example the white balancer could be removed. Other modules can be added such as for color enhancement. Other kinds of image sensors could be substituted, and additional buffering and pipeline registers can be added at several points in the data path. Parallel data paths could be used to increase throughput.

Larger buffers could be used, such as a 11-line Bayer-pattern buffer or a 9-line luminance buffer, or even full-frame buffers. Other YUV formats could be substituted, such as YUV 4:2:0 or YUV 4:2:2 format. Even YUV 4:4:4 format could be used, although with less efficiency. Pixels in the 7-line, 5-line, or 3-line buffer do not have to physically be stored in the arrangement shown. For large memories, one physical memory row could store all five rows of pixels. Various interleaving and mapping schemes could alter the actual storage locations to optimize bandwidth or other design parameters. Many memory arrangements, both physical and logical, are possible.

The 3-line buffer could be loaded directly from the edge-sharpener, or the edge-sharpener could load the output Y array or other storage, and then the 3-line buffer be loaded from this output Y array. The chrominance calculator could also directly read the output Y array or other memory. Various parallel processing techniques may be used that perform the basic operations described here in a serial fashion for easier understanding.

Rather than use the pattern 4 shown in FIG. 10A for chrominance calculations, other patterns could be substituted, such as pattern 1. Appropriate input and coefficient changes can be made by a person of skill in the art. Partial calculations may be performed near the edges of the Bayer pattern, such as for pixel locations 1,3 and 1,1 and 3,1. These edge locations lack the normal number of input pixels and must be averaged over a smaller number of pixel inputs.

While the enhancement filter has been described as enhancing or sharpening edges, other kinds of filters and coefficient values can be substituted. For example, an edge blurring filter could be used as the enhancement filter, or a dulling filter or a directional filter that enhances pixels on the right side more than on the left side, etc. Filter sizes other than 3×3 could also be substituted.

A small temporary buffer can be used for the 3-, 5-, and 7-line buffers. These buffers can be merged or expanded, and can receive either the newest pixels or the oldest pixels in the line. The size of the line buffer can also be varied for different horizontal resolutions.

Different segmentation of the pixel pipeline can be substituted, depending on logic delays in each pipestage. Rapid clocking and slow adders may require 2 clock cycles for each adder or multiplier in the calculators, or slower clocks and faster logic may allow both horizontal and vertical adders to operate in a single pipestage without actually latching in the intermediate values. Similar adjustments and modifications can be made to other stages and functional units.

Different data encodings and primary colors can be used. Bit widths can be varied. Many data formats may be used with the invention. Additional functions can be added. Many arrangements of adders, shifters, and logic units are possible. Adders may be reused or used recursively. Some image sensors may alter the Bayer pattern in different ways, such as by producing data from lower lines before upper lines. Various modifications can be made as needed to accommodate these changes.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A color converter and enhancer comprising:
   an input stream of incomplete pixels each having a red (R), a green (G), or a blue (B) value, but each incomplete pixel not having all three R, G, B values;
   a first multi-line buffer, receiving a first number of multiple lines of the incomplete pixels, the first number being less than a number of lines in a frame;
   a luminance generator, receiving R, G, and B values from the first multi-line buffer, for generating preliminary luminance values;
   a second multi-line buffer, receiving a second number of multiple lines of the preliminary luminance values, the second number being less than a number of lines in a frame and the second number being not larger than the first number;
   an enhancer, receiving the preliminary luminance values from the second multi-line buffer, for adjusting the preliminary luminance values to generate enhanced luminance values;
   a third multi-line buffer, receiving a third number of multiple lines of the enhanced luminance values, the third number being less than a number of lines in a frame and the third number being not larger than the second number; and
   a chrominance generator, receiving the enhanced luminance values from the third multi-line buffer and receiving some of the incomplete pixels from the first multi-line buffer, for generating chrominance values using the enhanced luminance values and some of the incomplete pixels,
   whereby enhanced luminance values are generated and used for chrominance calculation.

2. The color converter and enhancer of claim 1 wherein the enhancer sharpens edges by applying an edge-sharpening filter to the preliminary luminance values to generate the enhanced luminance values.

3. The color converter and enhancer of claim 2 wherein the edge-sharpening filter receives preliminary luminance values in at least 3 lines for each line of enhanced luminance values generated.

4. The color converter and enhancer of claim 3 wherein the edge-sharpening filter receives a box of 3 by 3 preliminary luminance values to generate a center enhanced luminance value in a center of the 3 by 3 box.

5. The color converter and enhancer of claim 4 wherein the edge-sharpening filter includes a 3 by 3 set of coefficients including a center coefficient that is multiplied by a center preliminary luminance value and surrounding coefficients that are each multiplied by surrounding preliminary luminance values;
   wherein the center coefficient has a magnitude that is larger than magnitudes of each of the surrounding coefficients.

6. The color converter and enhancer of claim 5 wherein the center coefficient has a magnitude that is at least as large as a sum of the magnitudes of the surrounding coefficients.

7. The color converter and enhancer of claim 6 wherein the center coefficient has a sign that is opposite to signs of the surrounding coefficients.

8. The color converter and enhancer of claim 2 wherein the luminance generator receives R, G, and B values from at least 3 lines of the first multi-line buffer; the luminance generator generating preliminary luminance values for a center line in the at least 3 lines.

9. The color converter and enhancer of claim 8 wherein the preliminary and enhanced luminance values are Y values and the chrominance values are U and V values, wherein color converter and enhancer outputs lines of YUV values having enhanced luminance values and chrominance values, whereby RGB values are converted to YUV values.

10. The color converter and enhancer of claim 2 wherein each of the incomplete pixels has only one color value, either a R value or a G value or a B value.

11. The color converter and enhancer of claim 10 wherein the incomplete pixels form a Beyer pattern.

12. The color converter and enhancer of claim 2 wherein the first multi-line buffer is a 7-line buffer for storing at least 7 lines of the incomplete pixels;
wherein the second multi-line buffer is a 5-line buffer for storing at least 5 lines of the preliminary luminance values;
wherein the third multi-line buffer is a 3-line buffer for storing at least 3 lines of the enhanced luminance values.

13. The color converter and enhancer of claim 2 wherein the chrominance generator combines two blue values and a block of enhanced luminance values to generate each U chrominance value;
wherein the chrominance generator combines two red values and a block of enhanced luminance values to generate each V chrominance value.

14. The color converter and enhancer of claim 13 wherein the block of enhanced luminance values comprises a 3 by 3 box of enhanced luminance values that are averaged before being combined with the red or blue values.

15. A method for directly generating enhanced YUV pixels from red (R), green (G), blue (B) pixels in an un-interpolated pattern comprising:
receiving an input block of at least 3 rows of at least 3 pixels per row of R, G, and B pixels in the un-interpolated pattern wherein each pixel location in the un-interpolated pattern is a partial pixel that is missing at least one of the R, G, and B color components;
determining a pattern type for the input block and selecting a selected coefficient block in response to the pattern type;
multiplying the input block by the selected coefficient block and summing to generate a preliminary Y component that represents an average brightness at a center of the input block;
generating and storing preliminary Y components for each pixel location;
multiplying an enhancement block of the preliminary Y components by an enhancer coefficient block and summing to generate an enhanced Y component that represents an edge-enhanced brightness at a center of the enhancement block;
generating and storing enhanced Y components for each pixel location;
reading stored enhanced Y components for locations in the input block and generating an average Y value for the input block from Y enhanced components;
reading at least two B pixels from the input block;
generating a U component from the at least two B pixels and from the average Y value while ignoring R and G pixels from the input block;
reading at least two R pixels from the input block; and
generating a V component from the at least two R pixels and from the average Y value while ignoring B and G pixels from the input block;
wherein the U and V components represent color of a YUV pixel while the enhanced Y component represents brightness of the YUV pixel,
whereby R, G, B pixels in the un-interpolated pattern are enhanced and directly converted to Y, U, and V components of YUV pixels without RGB interpolation.

16. The method of claim 15 wherein generating the U component and generating the V component occur when a center pixel in the input block is a G pixel, but do not occur when the center pixel is a R or a G pixel.

17. The method of claim 15 wherein the un-interpolated pattern is a Bayer pattern wherein each pixel location is a mono-color pixel that is missing two of the R, G, and B color components.

18. A color-space converter comprising:
input buffer means, receiving red (R), green (G), and blue (B) mono-color pixels arrayed in a pattern representing an image, for storing an input block of at least 3 lines of at least 3 mono-color pixels per line;
luminance calculator means, examining a pattern of the R, G, B pixels in the input block to determine a coefficient block, for multiplying the R, G, and B pixels in the input block by the coefficient block to generate a preliminary luminance component for a center pixel location within the input block;
preliminary luminance storage means, receiving preliminary luminance components from the luminance calculator means, for storing preliminary luminance components for pixel locations in a YUV color space representing the image;
enhance means, receiving a block of the preliminary luminance components from the preliminary luminance storage means, for multiplying the preliminary luminance components in the block by a filter coefficient block to generate an enhanced luminance component for a center pixel location within the block;
luminance storage means, receiving enhanced luminance components from the enhance means, for storing enhanced luminance components for pixel locations in a YUV color space representing the image; and
chrominance calculator means, receiving a least two B pixels from the input block and receiving at least two R pixels from the input block, for generating a U chrominance component for the center pixel location within the input block by averaging the at least two B pixels and averaging at least 9 enhanced luminance components from the luminance storage means for pixel locations within the input block, and for generating a V chrominance component for the center pixel location within the input block by averaging the at least two R pixels and averaging at least 9 enhanced luminance components from the luminance storage means for pixel locations within the input block,
whereby Y, U, and V components are enhanced and generated directly from the R, G, and B mono-color pixels in the input block without generation of multi-color RGB pixels.

19. The color-space converter of claim 18 wherein the enhance means, the luminance calculator means and the chrominance calculator means are programmable means in a digital-signal processor (DSP) or in an associative array processor.

20. The color-space converter of claim 18 wherein the input block is exactly 3 by 3 pixels and the center pixel location is a middle location.

* * * * *